(12) United States Patent
Rix (10) Patent No.: US 10,274,393 B2
(45) Date of Patent: Apr. 30, 2019

(54) MASS STIMULATOR AND USES THEREOF (71) Applicant: ROLLS-ROYCE plc, London (GB)

(72) Inventor: Andrew IJ Rix, Bristol (GB)

(73) Assignee: ROLLS-ROYCE plc, London (GB)

( * ) Notice: Subject to any disclaimer, the term of this patent is extended or adjusted under 35 U.S.C. 154(b) by 180 days.

(21) Appl. No.: 15/430,972

(22) Filed: Feb. 13, 2017

(65) Prior Publication Data

US 2017/0254716 A1   Sep. 7, 2017

(30) Foreign Application Priority Data

Mar. 4, 2016 (GB) .................................. 1603759.0

(51) Int. Cl.
   *G01M 1/16* (2006.01)
   *G01M 1/20* (2006.01)

(52) U.S. Cl.
   CPC ................ *G01M 1/20* (2013.01); *G01M 1/16* (2013.01)

(58) Field of Classification Search
   CPC ............ G01M 1/16; G01M 1/20; G01M 1/32; G01M 1/38; G01M 1/14; G01M 1/34; F16F 15/32
   See application file for complete search history.

(56) References Cited

U.S. PATENT DOCUMENTS

| 3,690,152 | A | * | 9/1972 | Hirtreiter | ................ | G01M 1/32 |
| | | | | | | 73/66 |
| 3,698,139 | A | * | 10/1972 | Everett | ............. | B23Q 11/0021 |
| | | | | | | 451/343 |
| 3,952,602 | A | * | 4/1976 | Lyman | .................... | G01M 1/22 |
| | | | | | | 73/457 |
| 4,494,400 | A | * | 1/1985 | Hill | ........................ | G01M 1/20 |
| | | | | | | 73/1.14 |

(Continued)

FOREIGN PATENT DOCUMENTS

| EP | 1460287 A1 | 9/2004 |
| JP | H04-19443 A | 1/1992 |
| WO | 03/060452 A2 | 7/2003 |

OTHER PUBLICATIONS

Jul. 28, 2016 Search Report issued in British Patent Application No. 1603759.0.

(Continued)

*Primary Examiner* — Helen C Kwok
(74) *Attorney, Agent, or Firm* — Oliff PLC (57) ABSTRACT

A mass simulator to determine unbalance of a rotor module in a balancing machine that simulates the mass of an adjacent rotor module. The mass simulator has a shaft extending along an axis of rotation of the mass simulator. The shaft has an attachment interface at one end for attaching to a corresponding interface, and has a support portion at the opposite end which is rotatably supportable in the balancing machine. The mass simulator has a mass body (Continued)

mounted to the shaft by a release mechanism allowing the mass body to be repeatably mounted to and dismounted from the shaft. The mass simulator being attached to the rotor module at the attachment interface and the assembly of the attached mass simulator and rotor module located in the balancing machine to determine unbalance of the rotor module with the mass body mounted to, and dismounted from, the shaft.

19 Claims, 4 Drawing Sheets

(56) References Cited

U.S. PATENT DOCUMENTS

| | | | | |
|---|---|---|---|---|
| 6,471,453 | B1* | 10/2002 | Winebrenner | B23B 31/00 408/143 |
| 2003/0154785 | A1* | 8/2003 | Calkins | F16F 15/322 73/469 |
| 2018/0041097 | A1* | 2/2018 | Kanahama | F03G 3/00 |

OTHER PUBLICATIONS

Schneider et al. "Exchangeability of Rotor Modules—A New Balancing Procedure in a Flexible State", Seventh International Conference on Vibrations in Rotating Machinery, pp. 101-108, 2000.
Jul. 5, 2017 European Search Report issued in Patent Application No. EP17155779.

* cited by examiner

MASS STIMULATOR AND USES THEREOF

FIELD OF THE INVENTION

The present invention relates to a mass simulator for determining unbalance of a rotor module in a balancing machine, and related uses.

BACKGROUND

During manufacture of the components making up a rotor module, such as a fan, compressor or turbine blade assembly in a gas turbine, efforts are made to minimise mass imbalances in the individual components. Nevertheless, eccentric mass imbalances will tend to arise in the completed module, for example due to manufacturing tolerances on the blades. Consequently, the module as a whole must undergo a balancing operation in order to prevent subsequent stress and vibration during operation of the module.

The vibration that is of principle concern is generally resonant vibration. This has a maximum amplitude when the speed of rotation of the rotor is at a critical speed (i.e. rotational speed frequency matching a natural frequency of the rotor system). Imbalances within the spool tend to drive the resonant vibration and increase its amplitude. This may cause excessive wear and stress on bearings for the spool, as well as its rotors. The balancing operation thus reduces imbalances and/or balances to compensate for them.

A spool of a gas turbine engine may be made up of plural modules, each treated independently from a balancing point of view (e.g. one module is a compressor assembly and another is a turbine assembly). Each module on the spool is typically balanced in its own right, rather than balance being simply obtained across the whole spool. This allows individual modules to be substituted without a need to re-balance the rest of the spool which would often require disassembly of the entire engine.

In balancing a module the following sources of imbalance are generally considered and compensated for:
1) Unbalance that arises within the module due to geometric errors, such as blades being slightly different weights, or the rotor being slightly radially mal-positioned with respect to the axis of rotation.
2) Unbalance that arises within the module due to the module's geometric error at its interface with another module. In particular, the interface may not be square as a consequence of the sum of miss-alignments of sub-units of the module.
3) Unbalance that arises outside of the module (that is, in the adjacent module) due to the module's geometric error at its interface with that other module.

To balance each module in its own right, even if the unbalance is of type 3), an unbalance caused by the module must be corrected by making an adjustment within the axial extent of the module on a balancing plane which extends perpendicular to the geometric axis of the module.

A two plane balancing correction is typically carried out by addition or removal of eccentric mass from the module at typically two axially spaced-apart balancing planes. In particular, weight can be added or removed from axially spaced balancing lands, which are usually located at respective ends of the module. This is achieved using a balancing machine, on which the module is rotated and its imbalances are measured. To account for unbalance of type 3), a mass simulator to simulate the (balanced) adjacent module may be used on the balancing machine.

Additionally or alternatively, imbalances can be reduced with particular build techniques such as: component balancing (balancing each component of the module), straight build (eliminating as far as possible the geometric errors that give rise to type 2) and 3) unbalance through careful building up of the sub-units of the module), and blade distribution (arranging the blades of different weights to better balance one another or the components within the module).

A difficulty with the use of balancing lands is that they may be significantly axially spaced from the unbalance that they are compensating for, especially in the case of type 3) unbalance. This axial spacing between the unbalance and its compensating balancing mass creates a bending moment, which may not be detectable at the low rotation speed of the balancing machine. If the bending moment results in flexing at higher rotation speeds, this can create a new imbalance that may drive a resonant vibration.

Figure 1:
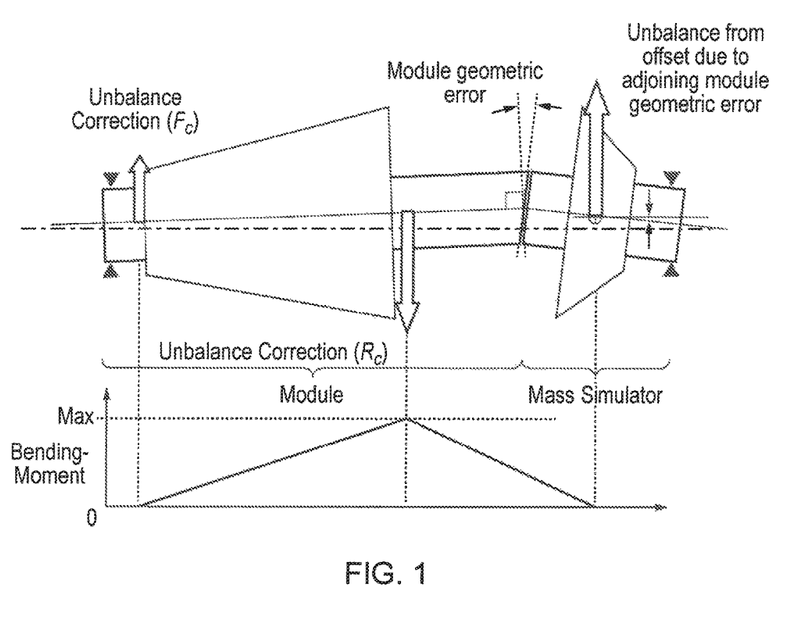
FIG. 1 shows schematically an assembly of a module and attached mass simulator located in a balancing machine.

This is illustrated schematically in FIG. 1, where a module such as a compressor being balanced in a balancing machine is shown attached to a turbine mass simulator. A geometric error (e.g. a non-square joint face) at the module's interface with the mass simulator produces an offset to the mass of the mass simulator. The unbalance generated due to the geometric error is indicated by an upward-pointing cross hatched arrow vector at the mass simulator. The mass simulator allows this unbalance to be detected and corrected by applying corrections indicated by the arrows indicated $F_c$ and $R_c$ at balancing planes of the module. However, a large bending moment, indicated by the graph at the bottom of FIG. 1, is introduced along the rotor by these corrections. The bending moment is not detected by the low speed balancing machine and will cause high vibration in the engine if the module operates at speeds near any flexible rotor modes.

One option is to perform balancing in the balancing machine with mass simulators of different masses to identify the size of the bending moment generated by the simulator. This information can then be used to inform a three location balance correction of the module which can ensure that the bending moment does not excite a flexible mode of the rotor. See, for example, H. Schneider, (2000), Exchangeability of rotor modules—a new balancing procedure for rotors in a flexible state, Seventh International Conference on Vibrations in Rotating Machinery (pp. 101-108), IMechE, where in the example a mass simulator and a "short mandrel" (effectively a zero mass simulator) are interchanged. However, a problem still exists that the time to perform balancing using two mass simulators is very significant. In particular, assembly and disassembly of the modular joint can be time consuming, involving complex joint assembly processes and moving large and easily damaged components around using complex machinery and tooling.

For two mass simulators, all assembly and disassembly steps have to be repeated for the second mass simulator. The entire process can take several working shifts. This problem is exacerbated if the bearing support locations for the mass simulators on the balancing machine are different, such that the balancing machine has to be set up differently for the two mass simulators, as would be the case for the use of a "short mandrel" as described by Schneider ibid.

SUMMARY

It would be desirable to reduce the length of time required for determining unbalances.

Accordingly, in a first aspect, the present invention provides a mass simulator for determining unbalance of a rotor module in a balancing machine, the mass simulator simulating the mass of an adjacent rotor module to which said rotor module is attached when in use, the mass simulator having:
- a shaft extending along an axis of rotation of the mass simulator, the shaft having at one end an attachment interface for attaching to a corresponding interface of said rotor module, and having at the opposite end a support portion which is rotatably supportable in the balancing machine; and
- a mass body mounted to the shaft by a release mechanism which allows the mass body to be repeatably mounted to and dismounted from the shaft;
- wherein the mass simulator can be attached to said rotor module at the attachment interface and the assembly of the attached mass simulator and rotor module located in the balancing machine to determine unbalance of said rotor module with the mass body mounted to the shaft and to determine unbalance of said rotor module with the mass body dismounted from the shaft.

The release mechanism enables repeatable and highly accurate positioning of the mass body on the shaft. The mass simulator with and without the mass body mounted is equivalent to two separate simulators of relatively high and low mass respectively. By avoiding a need to remove the assembly from the balancing machine between determinations (and also avoiding a need to form a new assembly with a second mass simulator after a first assembly is removed), the time needed to perform e.g. three location balancing to correct bending moments can be substantially reduced. Also any indexing (i.e. relative rotation) of the mass simulator to check joint repeatability may only have to be performed once, as the joint between the attachment interface and the corresponding interface of the rotor module is the same with and without the mass body mounted.

In a second aspect, the present invention provides a combination of a balancing machine and the mass simulator according to the first aspect.

In a third aspect, the present invention provides a method of determining unbalance of a rotor module, the method including:
- providing the mass simulator according to the first aspect;
- attaching the mass simulator to the module at the attachment interface of the mass simulator and a corresponding interface of the module, and locating the assembly of the attached mass simulator and module in a balancing machine; and
- in either order, using the balancing machine to determine the unbalance of the rotor module with the mass body mounted to the shaft, and using the balancing machine to determine the unbalance of the rotor module with the mass body dismounted from the shaft, the release mechanism being used to mount/dismount the mass body between the determinations.

In a fourth aspect, the present invention provides a procedure for balancing a rotor module, the procedure including:
- performing the method of the third aspect to determine unbalances of the module;
- using the unbalances to determine a multi-plane (e.g. two, three or more planes) balance correction of the module; and
- applying the correction to balance the module.

Optional features of the invention will now be set out. These are applicable singly or in any combination with any aspect of the invention.

The rotor module and can be a rotor module of a gas turbine engine, such as a compressor or turbine module.

The support portion can comprise a bearing track and a connection feature (such as a flange joint) for connection to the balancing machine.

In the (common) case of a two module rotor, the support portion can be directly rotatably supported in the balancing machine. However, in the case of e.g. a three module rotor, where the mass simulator has an interface to other modules at both ends, the support portion can be indirectly rotatably supported in the balancing machine via another module or other tooling. Thus the assembly of the attached mass simulator and module, when located in the balancing machine, can be an assembly of just these two components, or can be a larger assembly of three or more components.

The mass body may be a unitary annular mass body. This can provide a high degree of rotational symmetry, but may require the assembly of the attached mass simulator and rotor module to be lifted from the balancing machine to mount or dismount the mass body from the shaft. An option for a unitary annular mass body that avoids such lifting of the assembly, is to configure the body and shaft so that the body is axially slidable onto/off the shaft for mounting/dismounting. For example, the balancing machine can be provided with a static holder for the mass body in its slid off state. An axially slidable mass body allows the assembly of the attached mass simulator and rotor module to remain in the balancing machine between the determinations when the release mechanism is used to mount the mass body to and dismount the mass body from the shaft.

Another option is for the mass body to be formed in portions which combine together on the shaft to form the mass body, but can be dismounted therefrom into separate pieces. For example, each portion may form a respective angular segment of the mass body, combining with the other portions to form a continuous annulus around the shaft. In such an arrangement, conveniently just two, three or four portions may be used to form the mass body. An advantage of a mass body formed in portions is again that the assembly of the attached mass simulator and rotor module can remain in the balancing machine between the determinations when the release mechanism is used to mount the mass body to and dismount the mass body from the shaft. On the other hand, the joints between the portions have to be highly repeatably formable.

The release mechanism (e.g., in the case of a unitary annular mass body) may be an expanding mandrel joint or a tapered mandrel joint.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2:
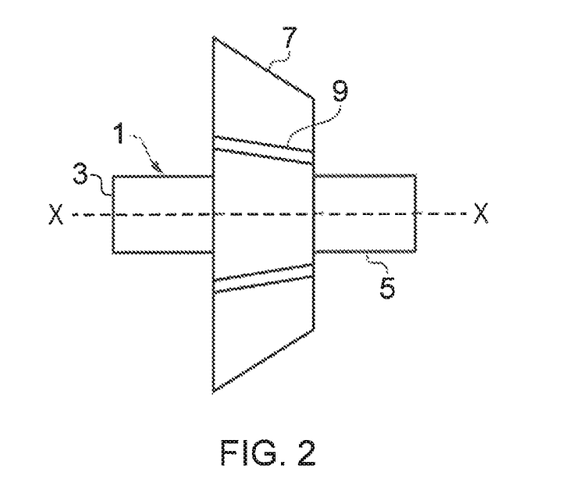
FIG. 2 shows schematically a mass simulator for determining unbalance of a rotor module.

FIG. 2 shows schematically a "dual mass" simulator for determining unbalance of a rotor module, such as a compressor section of a gas turbine engine, in a balancing machine. The dual mass simulator simulates the mass of an adjacent rotor module, such as a turbine section of the engine, to which the first rotor module is attached when in use.

The dual mass simulator has a shaft 1 which extends along an axis of rotation X-X of the simulator. One end of the shaft forms an attachment interface 3 which attaches to a corresponding interface of the module whose unbalance is to be determined to form an assembly of the module and the mass simulator. The other end of the shaft has a support portion 5 at which the simulator is rotatably supported in the balancing machine.

An annular mass body 7 is coaxial with the shaft 1, and is mounted thereto by a release mechanism 9, which as shown is a tapered mandrel joint. However, another option is to form the release mechanism as an expanding mandrel joint. Other forms of possible release mechanism are known to the skilled person.

The release mechanism 9 allows the mass body 7 to be quickly and repeatably mounted to and dismounted from the shaft with few fasteners and high positional accuracy. Thus the simulator has two masses: one with the mass body mounted to the shaft and the other without the mass body mounted to the shaft.

Figure 3:
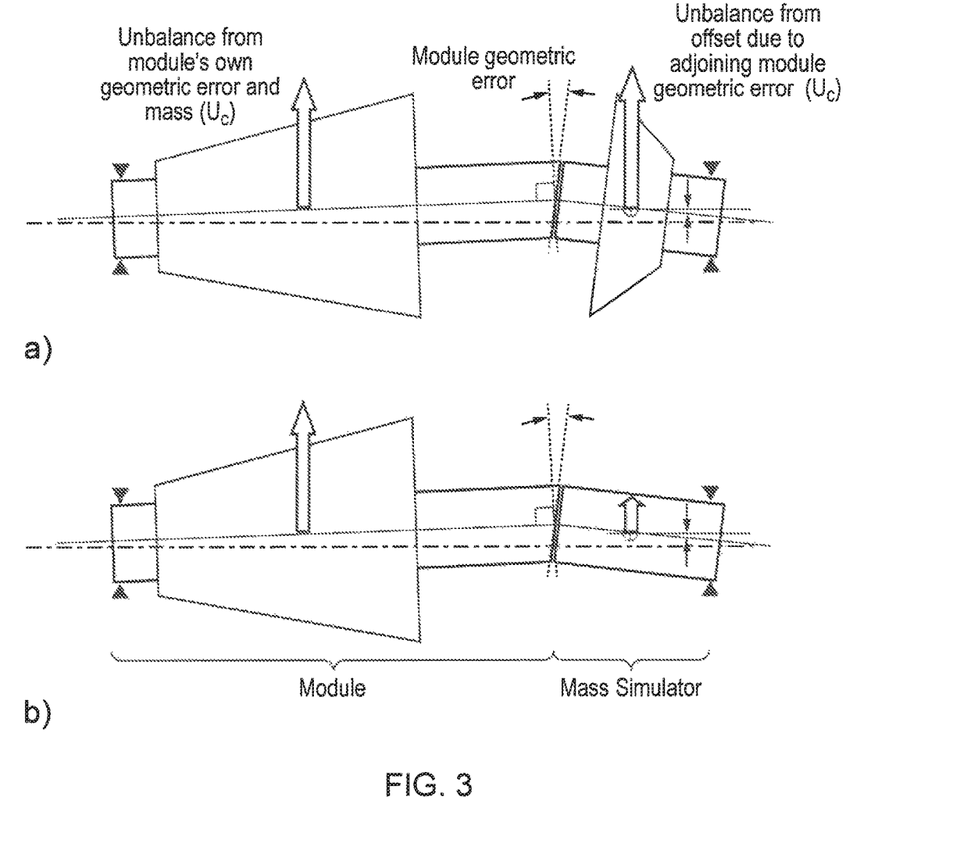
FIG. 3 shows schematically an assembly of a module and attached mass simulator located in a balancing machine (a) with a mass body mounted to a shaft of the mass simulator, and (b) without the mass body mounted to the shaft.

FIG. 3 shows schematically an assembly of the module and the attached mass simulator located in a balancing machine (a) with the mass body mounted to the shaft, and (b) without the mass body mounted to the shaft. The balancing machine is indicated by its support bearings (black triangles) at the ends of the assembly and its rotation axis (dash-dot line). The module's geometric error at its interface with the mass simulator produces unbalances at the module and the mass simulator indicated by respective upward-pointing arrow vectors. When the mass body is removed from the mass simulator, the unbalance at the simulator due to this geometric error reduces, and hence the respective vector arrow is smaller. The unbalance at the module from the geometric error, on the other hand, is unchanged as this is due to the geometric error and the mass of the module.

To determine these unbalances, the assembly with the mass body mounted to the shaft (FIG. 3(a)) is located in the balancing machine, and the total assembly unbalance due to module geometric errors is determined. Next, the mass body is dismounted from the shaft (FIG. 3(b)). The new assembly unbalance is detected and, taken together with the previous assembly unbalance readings, unbalance caused by the module geometric error can then be determined. The two assembly unbalance determinations (with mass body mounted and without mass body mounted) caused by the module geometric error can then be combined with other knowledge (i.e. rotor mode shapes) to calculate an appropriate multi-plane balance correction for the module. Advantageously, however, the amount of time required to make the two unbalance determinations is only increased relative to the time required to make a single unbalance determination by the time taken to dismount the mass body and establish the unbalance of the assembly without the mass body. No re-attachment of the module to the mass simulator are needed. Additional lifting of the assembly from and into the balancing machine to mount/dismount the annular mass body may be needed, but this can be avoided if the mass body is axially slidable off the shaft onto a static holder provided on the balancing machine. Another option which can avoid such additional lifting is to form the mass body in portions which combine together on the shaft to form the mass body, but can be dismounted therefrom into separate pieces.

The procedure can be performed in the opposite order, i.e. starting with the assembly without the mass body mounted to the shaft and finishing with the assembly with the mass body mounted to the shaft.

In summary, the only unbalance difference between the two assembly configurations of FIGS. 3(a) and (b) is due to the mass change to the simulator. However, because this is a known mass, the change in the unbalance readings due to the removal of the mass can be equated to unbalance arising from the simulator. Therefore the bending moment due to the simulator can be calculated, and the appropriate two, three or more planes of required balancing correction can be accurately calculated.

Figure 4:
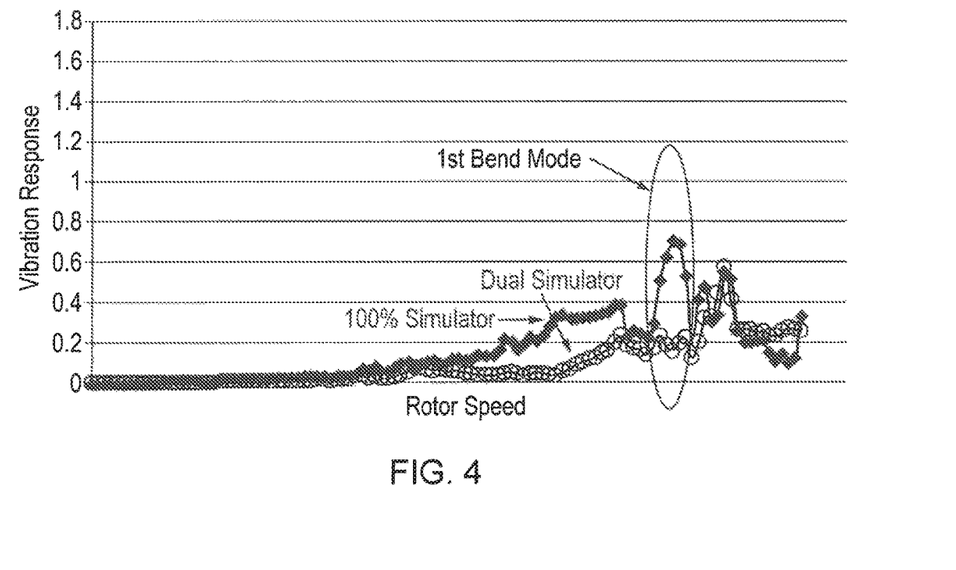
FIG. 4 shows plots of simulated vibration response against rotor speed for a rotor balanced with a dual mass simulator (circle data points) and a rotor balanced with a conventional mass simulator (diamond data points).

The benefit of balancing with a dual mass simulator relative to balancing with a single conventional mass simulator is illustrated in FIG. 4, which shows plots of simulated vibration response against rotor speed for a rotor balanced with the dual mass simulator (circle data points) and a rotor balanced with the conventional mass simulator (diamond data points). In particular, the simulation shows a vibration reduction of about 70% for the dual mass simulator at a critical resonance at the indicated 1st bend mode, and significant reductions through most of the rest of the speed range While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A mass simulator for determining unbalance of a rotor module in a balancing machine, the mass simulator simulating a mass of an adjacent rotor module to which said rotor module is attached when in use, the mass simulator having:
   a shaft extending along an axis of rotation of the mass simulator, the shaft having at one end an attachment interface for attaching to a corresponding interface of said rotor module, and having at an opposite end a support portion which is rotatably supportable in the balancing machine; and
   a mass body mounted to the shaft by a release mechanism which allows the mass body to be repeatably mounted to and dismounted from the shaft;
   wherein the mass simulator can be attached to said rotor module at the attachment interface and an assembly of the attached mass simulator and the rotor module located in the balancing machine to determine unbalance of said rotor module with the mass body mounted to the shaft and to determine unbalance of said rotor module with the mass body dismounted from the shaft.

2. The mass simulator according to claim 1, wherein the mass body is a unitary annular mass body.

3. The mass simulator according to claim 1, wherein the mass body is formed in portions which combine together on the shaft to form the mass body, but are dismountable therefrom into separate pieces.

4. The mass simulator according to claim 1, wherein the release mechanism is configured such that the assembly of the attached mass simulator and the rotor module can remain in the balancing machine between the determinations when the release mechanism is used to mount the mass body to and dismount the mass body from the shaft.

5. The mass simulator according to claim 2, wherein the release mechanism is configured such that the assembly of the attached mass simulator and the rotor module can remain in the balancing machine between the determinations when the release mechanism is used to mount the mass body to and dismount the mass body from the shaft.

6. The mass simulator according to claim 3, wherein the release mechanism is configured such that the assembly of the attached mass simulator and the rotor module can remain in the balancing machine between the determinations when the release mechanism is used to mount the mass body to and dismount the mass body from the shaft.

7. A combination of the balancing machine and the mass simulator according to claim 1.

8. A combination of the balancing machine and the mass simulator according to claim 2.

9. A combination of the balancing machine and the mass simulator according to claim 3.

10. A combination of the balancing machine and the mass simulator according to claim 4.

11. A combination of the balancing machine and the mass simulator according to claim 5.

12. A combination of the balancing machine and the mass simulator according to claim 6.

13. A method of determining unbalance of the rotor module, the method including:
provide the mass simulator according to according to claim 1;
attaching the mass simulator to the rotor module at the attachment interface of the mass simulator and a corresponding interface of the rotor module, and locating the assembly of the attached mass simulator and the rotor module in the balancing machine; and
in either order, using the balancing machine to determine the unbalance of the rotor module with the mass body mounted to the shaft, and using the balancing machine to determine the unbalance of the rotor module with the mass body dismounted from the shaft, the release mechanism being used to mount and dismount the mass body between the determinations.

14. A method of determining unbalance of the rotor module, the method including:
providing the mass simulator according to according to claim 2;
attaching the mass simulator to the rotor module at the attachment interface of the mass simulator and a corresponding interface of the rotor module, and locating the assembly of the attached mass simulator and the rotor module in the balancing machine; and
in either order, using the balancing machine to determine the unbalance of the rotor module with the mass body mounted to the shaft, and using the balancing machine to determine the unbalance of the rotor module with the mass body dismounted from the shaft, the release mechanism being used to mount and dismount the mass body between the determinations.

15. A method of determining unbalance of the rotor module, the method including:
providing the mass simulator according to according to claim 3;
attaching the mass simulator to the rotor module at the attachment interface of the mass simulator and a corresponding interface of the rotor module, and locating the assembly of the attached mass simulator and the rotor module in the balancing machine; and
in either order, using the balancing machine to determine the unbalance of the rotor module with the mass body mounted to the shaft, and using the balancing machine to determine the unbalance of the rotor module with the mass body dismounted from the shaft, the release mechanism being used to mount and dismount the mass body between the determinations.

16. A method of determining unbalance of the rotor module, the method including:
providing the mass simulator according to according to claim 4;
attaching the mass simulator to the rotor module at the attachment interface of the mass simulator and a corresponding interface of the rotor module, and locating the assembly of the attached mass simulator and the rotor module in the balancing machine; and
in either order, using the balancing machine to determine the unbalance of the rotor module with the mass body mounted to the shaft, and using the balancing machine to determine the unbalance of the rotor module with the mass body dismounted from the shaft, the release mechanism being used to mount and dismount the mass body between the determinations.

17. A method of determining unbalance of the rotor module, the method including:
providing the mass simulator according to according to claim 5;
attaching the mass simulator to the rotor module at the attachment interface of the mass simulator and a corresponding interface of the rotor module, and locating the assembly of the attached mass simulator and the rotor module in the balancing machine; and
in either order, using the balancing machine to determine the unbalance of the rotor module with the mass body mounted to the shaft, and using the balancing machine to determine the unbalance of the rotor module with the mass body dismounted from the shaft, the release mechanism being used to mount and dismount the mass body between the determinations.

18. A method of determining unbalance of the rotor module, the method including:
providing the mass simulator according to according to claim 6;
attaching the mass simulator to the rotor module at the attachment interface of the mass simulator and a corresponding interface of the rotor module, and locating the assembly of the attached mass simulator and the rotor module in the balancing machine; and
in either order, using the balancing machine to determine the unbalance of the rotor module with the mass body mounted to the shaft, and using the balancing machine to determine the unbalance of the rotor module with the mass body dismounted from the shaft, the release mechanism being used to mount and dismount the mass body between the determinations.

19. A procedure for balancing the rotor module, the procedure including:

performing the method of claim 13 to determine unbalances of the rotor module;
using the unbalances to determine a multi-plane balance correction of the rotor module; and
applying the correction to balance the rotor module.

\* \* \* \* \*